US006892563B2

(12) United States Patent
Gustafson et al.

(10) Patent No.: US 6,892,563 B2
(45) Date of Patent: May 17, 2005

(54) CALIBRATION APPARATUS AND METHOD FOR ROLL COVERS WITH EMBEDDED SENSORS

(75) Inventors: Eric J. Gustafson, Stephens City, VA (US); Robert L. Olinger, Front Royal, VA (US)

(73) Assignee: Stowe Woodward LLC, Middletown, VA (US)

( * ) Notice: Subject to any disclaimer, the term of this patent is extended or adjusted under 35 U.S.C. 154(b) by 112 days.

(21) Appl. No.: 10/304,223

(22) Filed: Nov. 26, 2002

(65) Prior Publication Data

US 2004/0099042 A1 May 27, 2004

(51) Int. Cl.[7] ............................................. G01L 25/00
(52) U.S. Cl. ...................................... 73/1.14; 73/1.15
(58) Field of Search ............................... 73/1.14, 1.01, 73/1.15, 1.22

(56) References Cited

U.S. PATENT DOCUMENTS 2,974,518 A * 3/1961 Jones .......................... 73/1.13
3,738,151 A * 6/1973 Giunta et al. ................ 73/1.14
5,448,146 A * 9/1995 Erlbacher .................. 318/568.17

* cited by examiner

Primary Examiner—Hezron Williams
Assistant Examiner—Rodney Frank
(74) Attorney, Agent, or Firm—Myers Bigel Sibley & Sajovec

(57) ABSTRACT

An apparatus for facilitating calibration of sensors embedded within an object includes: a foundation; a force generator mounted on the foundation configured to generate a force in a first direction; a load cell connected with the force generator that detects the magnitude of force applied by the force generator; a roller mounting assembly pivotally interconnected with the foundation and pivotable about a first axis of rotation, the first axis of rotation being generally perpendicular to the first direction; and a roller rotatably mounted on the roller mounting assembly for rotation about a second axis of rotation, the second axis of rotation being generally perpendicular to the first direction, the roller protruding in the first direction sufficiently to apply a force to the object. This apparatus can enable force applied to the sensor to be calibrated with sensor output.

33 Claims, 3 Drawing Sheets

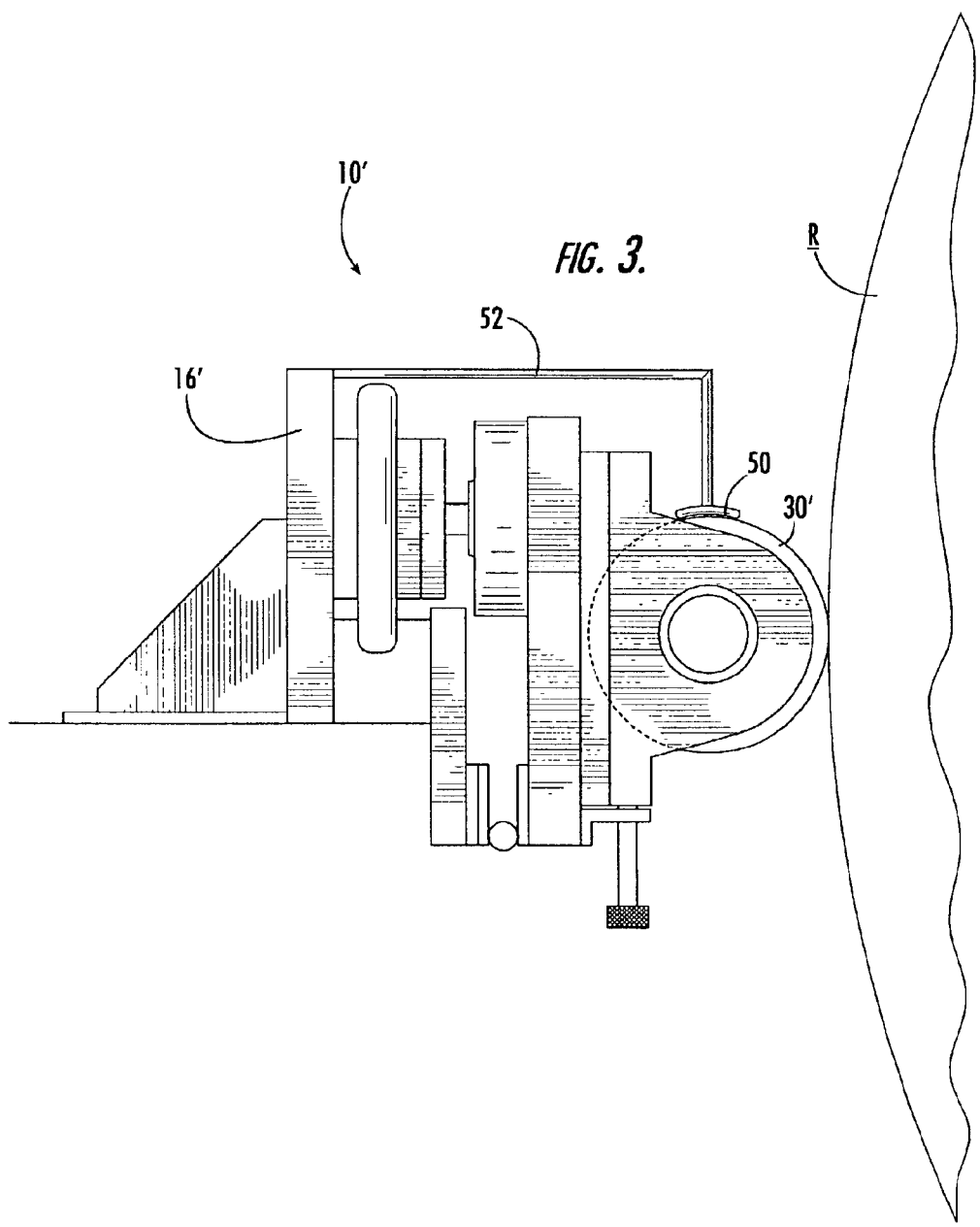

CALIBRATION APPARATUS AND METHOD FOR ROLL COVERS WITH EMBEDDED SENSORS

FIELD OF THE INVENTION

The present invention relates generally to the measurement of properties of industrial roll covers and other objects, and more particularly to the calibration of measurement devices used for such measurement.

BACKGROUND OF THE INVENTION

Cylindrical rolls are utilized in a number of industrial applications, especially those relating to papermaking. Such rolls are typically employed in demanding environments in which they can be exposed to high dynamic loads and temperatures and aggressive or corrosive chemical agents. As an example, in a typical paper mill, rolls are used not only for transporting a fibrous web sheet between processing stations, but also, in the case of press section and calender rolls, for processing the web sheet itself into paper.

Typically rolls used in papermaking are constructed with the location within the papermaking machine in mind, as rolls residing in different positions within the papermaking machines are required to perform different functions. Because papermaking rolls can have many different performance demands, and because replacing an entire metallic roll can be quite expensive, many papermaking rolls include a polymeric cover that surrounds the circumferential surface of a typically metallic core. By varying the material employed in the cover, the cover designer can provide the roll with different performance characteristics as the papermaking application demands. Also, repairing, regrinding or replacing a cover over a metallic roll can be considerably less expensive than the replacement of an entire metallic roll. Exemplary polymeric materials for covers include natural rubber, synthetic rubbers such as neoprene, styrene-butadiene (SBR), nitrile rubber, chlorosulfonated polyethylene ("CSPE"—also known under the trade name HYPALON® from DuPont), EDPM (the name given to an ethylene-propylene terpolymer formed of ethylene-propylene diene monomer), polyurethane, thermoset composites, and thermoplastic composites.

In many instances, the roll cover will include at least two distinct layers: a base layer that overlies the core and provides a bond thereto; and a topstock layer that overlies and bonds to the base layer and serves the outer surface of the roll (some rolls will also include an intermediate "tie-in" layer sandwiched by the base and top stock layers). The layers for these materials are typically selected to provide the cover with a prescribed set of physical properties for operation. These can include the requisite strength, elastic modulus, and resistance to elevated temperature, water and harsh chemicals to withstand the papermaking environment. In addition, covers are typically designed to have a predetermined surface hardness that is appropriate for the process they are to perform, and they typically require that the paper sheet "release" from the cover without damage to the paper sheet. Also, in order to be economical, the cover should be abrasion- and wear-resistant.

Some rolls are present as "nip" rolls, wherein two or more rolls are positioned such that they form a "nip" through which a web can pass. Such rolls are often found, for example, in the press section of a papermaking machine. The rolls press against the web at a prescribed pressure in order to advance processing. However, in some instances the rolls can apply pressure unevenly on the web. Uneven pressure application can result from many circumstances, including (a) the cover of one or more rolls being slightly "out of round", (b) one roll being mounted so that its axis is not parallel to that of its mating roll, or (c) increased localized wear on one of the roll covers. Irrespective of the cause of the uneven pressure, its presence can negatively impact processing of the web, and can in extreme instances harm the cover or even cause it to fracture.

Some systems for attempting to detect the pressure at different locations within a roll or roll cover are available. One system includes a flexible strip on which are mounted multiple pressure sensors that can be placed between the rolls and provide pressure readings (see, e.g. U.S. Pat. No. 5,953,230 to Moore). Another system employs sensors that are embedded in the roll cover itself and provide signals to an external processor (see, e.g., U.S. Pat. No. 5,699,729 to Moschel et al.).

Systems that employ embedded sensors can be particularly desirable, as they can be monitored easily, even during operation of the roll. Of course, it is important that the embedded sensors be accurate as they detect their particular property of interest. Calibration of the sensors is typically recommended and/or required, as the sensor output can vary due to differences in manufacturing, orientation, and the thickness of the material that covers the sensor. As such, a device and/or method that facilitates calibration of embedded sensors would be desirable.

SUMMARY OF THE INVENTION

The present invention is directed to an apparatus and method for calibrating covered rolls having embedded sensors. As a first aspect, the invention includes an apparatus for facilitating calibration of sensors embedded within an object, comprising: a foundation; a force generator mounted on the foundation configured to generate a force in a first direction; a load cell connected with the force generator that detects the magnitude of force applied by the force generator; a roller mounting assembly pivotally interconnected with the foundation and pivotable about a first axis of rotation, the first axis of rotation being generally perpendicular to the first direction; and a roller rotatably mounted on the roller mounting assembly for rotation about a second axis of rotation, the second axis of rotation being generally perpendicular to the first direction, the roller protruding in the first direction sufficiently to apply a force to the object. This apparatus can enable force applied to the sensor to be calibrated with sensor output.

In some embodiments, two force generators (preferably inflatable air bags) and two load cells are employed. Also, in some embodiments, the apparatus includes a temperature sensor that can detect the temperature of the roller or the object. Such detection can indicate when the object has reached a temperature equilibrium, which can improve the accuracy of calibration.

As a second aspect, the invention is directed to a method of calibrating an object with embedded sensors. The method begins with the provision of an object with sensors embedded therein and an apparatus as described above. The method continues with the actuation of the force generator to apply a force to the object through the roller. Next, the force generated by the force generator with the load cell is measured, with the output from the sensor responsive to the force applied to the object by the roller also being measured. These previous three steps are repeated for different forces of differing magnitude to correlate pressure input with sensor output.

In some embodiments, the object is a covered roll, and the object is rotating during application of the force. Some embodiments comprise the monitoring of the temperature of the roller or the object in order to detect when temperature equilibrium is reached; this monitoring typically occurs after to the application of force to the object.

BRIEF DESCRIPTION OF THE FIGURES

FIG. 3 is a side view of another embodiment of an apparatus for calibrating sensors embedded in a covered roll according to embodiments of the present invention.

DETAILED DESCRIPTION OF THE INVENTION

Figure 1:
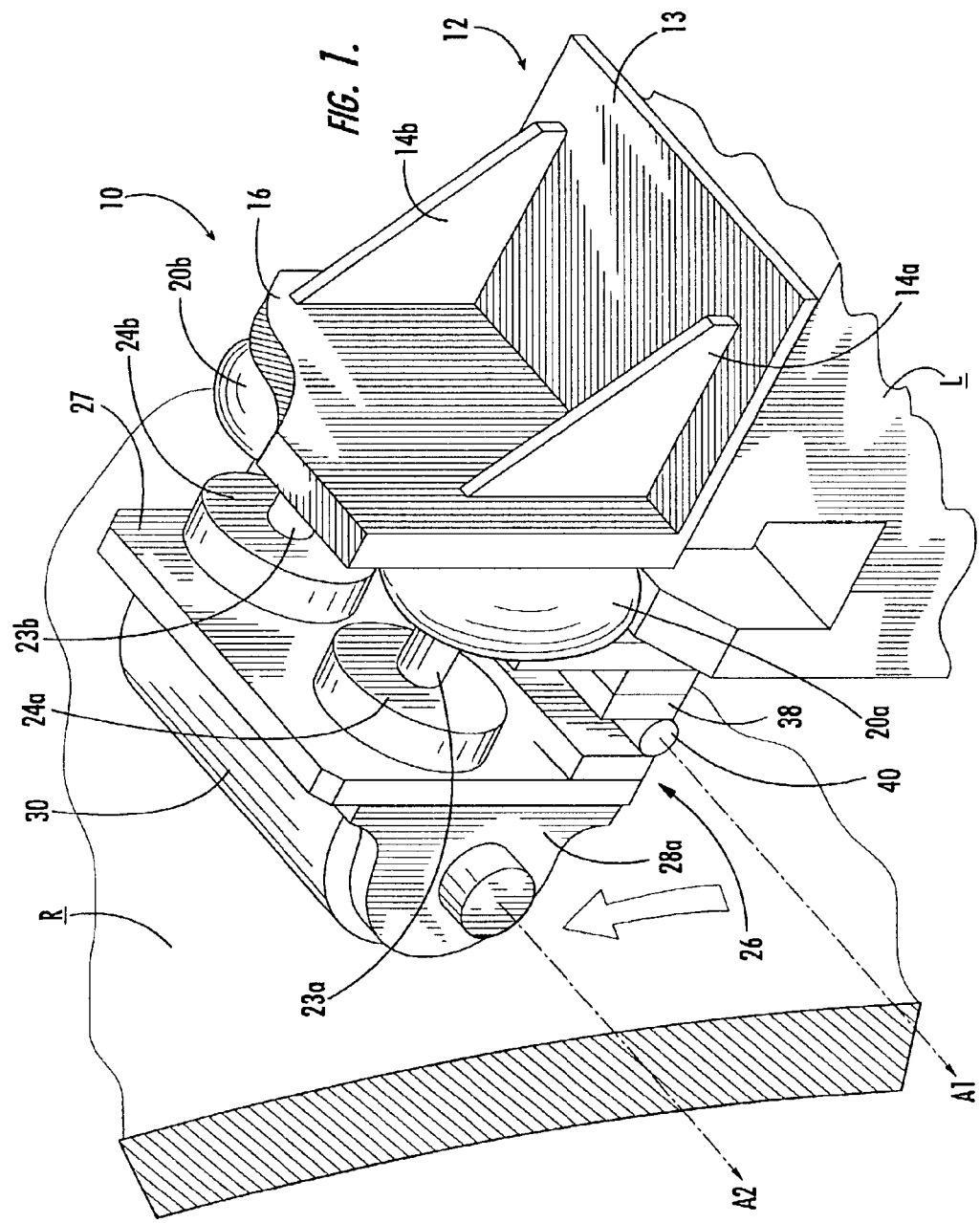
FIG. 1 is a perspective view of an apparatus for calibrating sensors embedded in a covered roll according to embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Figure 2:
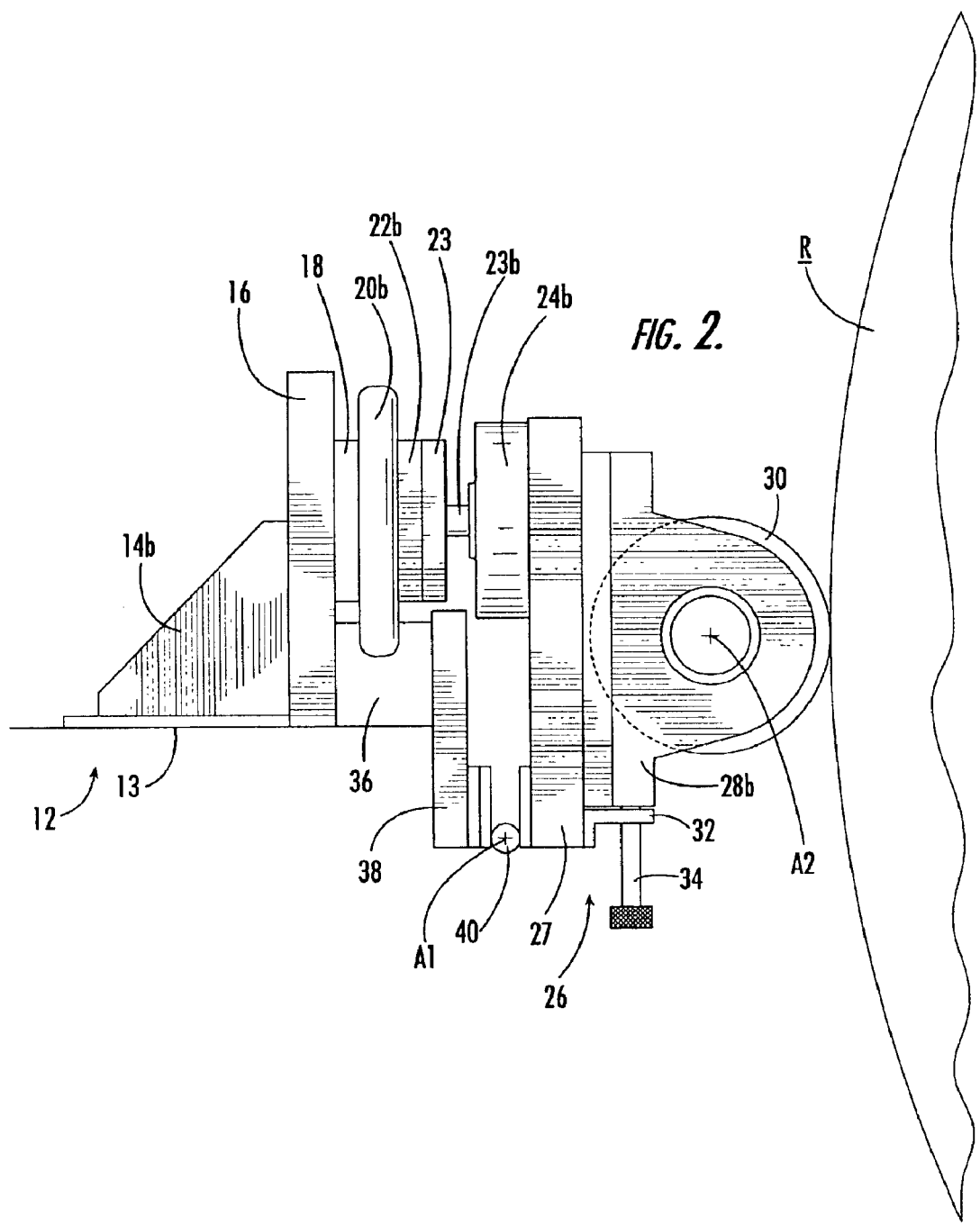
FIG. 2 is a side view of the apparatus of FIG. 1.

Referring now to the drawings, a calibrating apparatus, designated broadly at 10, is shown in FIGS. 1 and 2. The calibrating apparatus 10 can be mounted on a lathe L or another rotary device, such as a grinder or the like, that is typically employed to carry out operations on the surface of a covered roll R. The locations, positions and movements of certain components of the apparatus 10 will be described hereinafter by reference to their positions relative to other components thereof. As used herein, "forward" and derivatives thereof and "front" and derivatives thereof refer to the direction defined by a vector parallel to a surface underlying the apparatus 10 and extending from the apparatus 10 toward the roll R. The terms "rear," "rearward," and derivatives thereof refer to the direction opposite the forward direction; i.e., the direction defined by a vector extending parallel to the underlying surface from the roll R toward the apparatus 10. Together, the forward and rearward directions form the "longitudinal" directions of the apparatus 10. The terms "lateral," "outer," and derivatives thereof refer to the directions defined by vectors originating at a vertical longitudinal plane bisecting the apparatus 10 and extending parallel to the underlying surface and perpendicular to the forward direction. The terms "inward," "inner," "inboard," and derivatives thereof refer to the directions that are opposite the lateral directions; i.e., the directions defined by vectors originating at the lateral edges of the apparatus 10 and extending toward the aforementioned bisecting plane. Together, the inward and lateral directions form the "transverse" directions of the apparatus 10.

The apparatus 10 includes a generally horizontal foundation 12 that is mounted to the compound of the lathe (i.e., that portion of the lathe on which cutting tools are mounted). The foundation 12 includes a generally horizontal base plate 13 and a generally vertical airbag mounting member 16, which is fixed to and rises upwardly from the front edge of the base plate 13. Two triangular supports 14a, 14b are fixed to the upper surface of the base plate 13 and the rear surface of the airbag mounting member 16. The foundation 12 also includes a spanning member 36 that extends forwardly from the front surface of the airbag mounting member 16, and further includes a hinge mounting plate 38 that is fixed to the front edge of the spanning member 36 and extends downwardly therefrom.

Those skilled in this art will recognize that the foundation 12 may take other configurations. For example, the dimensions and thicknesses of the illustrated components may vary, two or more of the components may be formed as unitary members or as separate components, or the base plate 13 may be configured to attach to a device other than a rotary device. In any event, the foundation should be shaped to provide suitable mounting locations for the other components of the apparatus 10, and should be formed of a material (such as steel) that is sufficiently strong and rigid to withstand the rigors of operation.

Referring again to FIGS. 1 and 2, two airbags 20a, 20b are mounted to the front surface of the airbag mounting member 16 via necks 18. The airbags 20a, 20b are mounted in transverse alignment on the airbag mounting member 16. The airbags 20a, 20b (typically formed of rubber) are inflatable and are connected to a pneumatic pressure source (not shown). Upon inflation, the airbags 20a, 20b exert a force/pressure onto components to which they are connected.

Those skilled in this art will recognize that the invention may utilize alternative configurations to generate force or pressure. For example, in some embodiments, only one airbag may be employed. In other embodiments, other force generators, such as hydraulic systems, mechanical systems, electromagnetic systems, and the like, may also be employed to generate force/pressure for the apparatus 10.

Referring still to FIGS. 1 and 2, two load cells 24a, 24b are attached to respective load cell plates 23 (only one of which is illustrated herein) via threaded shafts 23a, 23b. The load cell plates 23 are in turn attached to necks 22b of the airbags 20a, 20b. The load cells 24a, 24b are of conventional construction and need not be described in detail herein. The load cells 24a, 24b are configured to measure a load applied in the longitudinal direction by the airbags 20a, 20b. A preferred load cell is the SWP-5K-4 model, available from Transducer Techniques (Temecula, Calif.). Other force measuring devices may be substituted for the load cells 24a, 24b.

Referring once more to FIGS. 1 and 2, a roller mounting assembly 26 is attached to the forward ends of the load cells 24a, 24b. The roller mounting assembly 26 includes a bearing mounting plate 27 that extends downwardly to a pivotal interconnection with the lower end of the hinge mounting plate 38 via a hinge 40, such that the bearing mounting plate 27 is free to pivot about a transverse axis of rotation A1. It is preferred that the hinge 40 have very precise tolerances and that it be able to withstand very high loads (as much as 4,000 lb. or more) applied perpendicularly to the axis A1.

Referring still again to FIGS. 1 and 2, the roller mounting assembly 26 also includes two roller bearings 28a, 28b that are mounted onto the front surface of the bearing mounting plate 27 via screws or other fasteners. A flange 32 is fixed (typically via threaded fasteners) to the lower portion of the front surface of the bearing mounting plate 27. Two set screws 34 (only one is shown herein in FIG. 2) extend upwardly through the flange 32 and contact the lower edges of the roller bearings 28a, 28b.

Referring once again to FIGS. 1 and 2, a roller 30 is rotatably mounted in the roller bearings 28a, 28b for rotation about a transverse axis of rotation A2. The roller 30 may take any number of forms, but is preferably formed of a material (such as steel) that is uncovered or covered with cover that has a hardness of at least 3 P&J. Also, the roller 30 may be of any desired length and diameter, but is preferably between about 2 and 5 inches in length and 3 and 8 inches in diameter.

Mounting and operation of the apparatus 10 begins with the mounting of a covered roll R in which sensors have been embedded onto a rotary device, such as the aforementioned lathe or grinder, that is ordinarily employed to perform operations on such a roll. The sensors can be any type of sensor that detects pressure applied thereto or stress/strain induced therein; exemplary sensors include optical, piezoelectric, and piezoresistive sensors. An exemplary optical sensor is disclosed in U.S. patent application Ser. No. 09/489,768, the disclosure of which is hereby incorporated herein in its entirety. The cover of the roll R is typically a polymeric material such as rubber, polyurethane, epoxy, blends, mixtures and combinations thereof, and the sensors are typically embedded below the surface of the cover. In some embodiments, after the roll R is mounted onto the rotary device, the axial locations of the sensors are marked to facilitate positioning of the apparatus 10.

After the roll R is mounted, the apparatus 10 is mounted onto the rotary device. More specifically, in the illustrated embodiment the base plate 13 is mounted to the compound of the lathe. It is preferred that the mounting be achieved (for example, with slots being present in the base plate 13 or in the compound of the lathe through which bolts are inserted) such that the base plate 13 may be shifted longitudinally (i.e., toward and away from the roll R) to enable the roller 30 to be positioned precisely. Typically, the desired position for the roller 30 is parallel to and nearly touching the roll R. The proximity of the roller 30 to the roll R can be adjusted by sliding the foundation 12 relative to the lathe (i.e., this movement adjusts the roller 30 in the horizontal plane) and checking the position with a nip foil. The roller 30 can be adjusted in the vertical plane by adjustment of the set screws 34, which can alter the level of the roller bearings 28a, 28b and, in turn, the orientation of the axis A2 of the roller 30; this alignment can be checked with a level resting on the roller 30.

Once positioned, the apparatus 10 can then be used to calibrate the sensors in the roll R. The roll R is rotated about its axis by the lathe (a speed of 45 rpm or greater is typical). The airbags 20a, 20b are then inflated by the pressure source until the roller 30 is applying a desired load (as measured by the load cell) to the roll R (because the bearing mounting assembly 26 is free to pivot about the hinge 40, force applied by the airbag 20a, 20b is transmitted to the roller 30). It is preferred that, if multiple airbags (like the airbags 20a, 20b illustrated herein) are employed, that they be loaded to similar levels. Data regarding sensor output is collected for the measured load. The load is then increased incrementally (typically, three or more different loads are applied, at levels that may vary between about 100 and 1,500 pli), and data collected for each load. The apparatus 10 is then shifted axially (this can usually be accomplished by moving the compound of the lathe along the axis of the roll R) to the next sensor position, and the loading and data collection steps are repeated. From this data, correlations between load and sensor output can be developed that can be employed when collecting and interpreting sensor data on the roll during operation on a paper machine or other mechanical system.

Another embodiment of an apparatus of the present invention is illustrated in FIG. 3 and designated broadly therein at 10'. The apparatus 10' includes the same components as the apparatus 10, but also includes a thermocouple mounting arm 52 that is attached to the airbag mounting plate 16' and extends forwardly to the roller 30'. A thermocouple 50 is attached to the free end of the thermocouple mounting arm 52 and rests upon the roller 30'. The thermocouple 50 illustratively and preferably has a concave surface that matches the surface of the roller 30'.

The thermocouple 50 detects the temperature of the surface of the roller 30' during the calibration procedure. The thermocouple 50 may be included on an apparatus of the present invention to address variations in sensor output as a function of load due to temperature. This capability can be useful in that certain sensors provide output based on the strain they experience under load. The strain for a particular sensor is dependent upon the applied load and the modulus of elasticity of the cover material. Because polymeric roll covers are formed of materials for which the modulus of elasticity can vary significantly over the temperatures of operation, the sensor output for a particular load can vary until the cover reaches a temperature equilibrium. One method of detecting temperature equilibrium for the cover is to measure the temperature of the roller 30' (which should, at equilibrium, have essentially the same temperature as the roll R, or have a temperature that can, through empirical testing and/or calibration, be related to the temperature of the roll R) over a period of time under load until the temperature stabilizes. Once the temperature has stabilized, the calibration of the sensors can proceed, and more accurate results can be obtained.

Those skilled in this art will appreciate that the apparatus 10' may take other configurations. For example, a pyrometer or other temperature sensing device may be employed instead of a thermocouple. Also, the temperature sensing device may be mounted on other locations on the apparatus 10', such as on the bearing mounting plate. Further, the surface of the roll R may be measured directly, or the temperature of either the roller 30' or the roll R may be measured using a non-contact technique (such as an IR-based system).

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An apparatus for facilitating calibration of sensors embedded within an object, comprising:

a foundation;

a force generator mounted on the foundation configured to generate a force in a first direction;

a load cell connected with the force generator that detects the magnitude of force applied by the force generator;

a roller mounting assembly pivotally interconnected with the foundation and pivotable about a first axis of rotation, the first axis of rotation being generally perpendicular to the first direction;

a roller rotatably mounted on the roller mounting assembly for rotation about a second axis of rotation, the second axis of rotation being generally perpendicular to the first direction, the roller protruding in the first direction sufficiently to apply a force to the object.

2. The apparatus defined in claim 1, wherein the force generator is an inflatable air bag.

3. The apparatus defined in claim 1, wherein the force generator and roller are configured such that the roller applies a pressure to the object of between about 100 and 1,500 pli.

4. The apparatus defined in claim 1, wherein the surface of the roller has a hardness of at least 3 P&J.

5. The apparatus defined in claim 4, wherein the roller is formed of steel.

6. The apparatus defined in claim 1, wherein the roller mounting assembly includes a bearing mounting plate and roller bearings mounted thereon, and the roller is mounted in the bearings.

7. The apparatus defined in claim 6, wherein the roller mounting assembly further comprises a set screw that adjusts the axial orientation of the roller.

8. The apparatus defined in claim 1, wherein the foundation is configured to mount on one of a lathe and a grinder.

9. An apparatus for facilitating calibration of sensor embedded within an object, comprising
- a foundation;
- a force generator mounted on the foundation configured to generate a force in a first direction;
- a load cell connected with the force generator that detects the magnitude of force applied by the force generator;
- a roller mounting assembly pivotally interconnected with the foundation and pivotable about a first axis of rotation, the first axis of rotation being generally perpendicular to the first direction;
- a roller rotatably mounted on the roller mounting assembly for rotation about a second axis of rotation, the second axis of rotation being generally perpendicular to the first direction, the roller protruding in the first direction sufficiently to apply a force to the object; and
- a temperature sensor.

10. The apparatus defined in claim 9, wherein the temperature sensor is mounted on the foundation and projects therefrom to a position from which it senses temperature on the roller.

11. The apparatus defined in claim 9, wherein the temperature sensor is a thermocouple.

12. The apparatus defined in claim 10, wherein the temperature sensor is mounted such that it contacts the roller.

13. An apparatus for facilitating calibration of sensors embedded within an object, comprising:
- a foundation;
- a pair of force generators mounted on the foundation, each force generator configured to generate a force in a first direction;
- a pair of load cells, each connected with a respective force generator to detect the magnitude of force applied by that force generator;
- a roller mounting member pivotally interconnected with the foundation and pivotable about a first axis of rotation, the first axis of rotation being generally perpendicular to the first direction;
- a roller rotatably mounted on the roller mounting member for rotation about a second axis of rotation, the second axis of rotation being generally perpendicular to the first direction, the roller protruding in the first direction sufficiently to apply a force to the object.

14. The apparatus defined in claim 13, wherein the force generators are inflatable air bags.

15. The apparatus defined in claim 13, wherein the force generators and roller are configured such that the roller applies a pressure to the object of between about 100 and 1,500 pli.

16. The apparatus defined in claim 13, wherein the surface of the roller has a hardness of at least 3 P&J.

17. The apparatus defined in claim 16, wherein the roller is formed of steel.

18. The apparatus defined in claim 13, wherein the roller mounting assembly includes a bearing mounting plate and roller bearings mounted thereon, and the roller is mounted in the bearings.

19. The apparatus defined in claim 18, wherein the roller mounting assembly further comprises a set screw that adjusts the axial orientation of the roller.

20. The apparatus defined in claim 13, wherein the foundation is configured to mount on one of a lathe and a grinder.

21. An apparatus for facilitation calibration of sensors embedded within an object, comprising:
- a foundation;
- a pair of force generators mounted on the foundation, each force generator configured to generate a force in a first direction;
- a pair of load cells, each connected with a respective force generator to detect the magnitude of force applied by that force generator;
- a roller mounting member pivotally interconnected with the foundation and pivotable about a first axis of rotation, the first axis of rotation being generally perpendicular to the first direction;
- a roller rotatably mounted on the roller mounting member for rotation about a second axis of rotation, the second axis of rotation being generally perpendicular to the first direction, the roller protruding in the first direction sufficiently to apply a force to the object; and
- a temperature sensor.

22. The apparatus defined in claim 21, wherein the temperature sensor is mounted on the foundation and projects therefrom to a position from which it senses temperature on the roller.

23. The apparatus defined in claim 21, wherein the temperature sensor is a thermocouple.

24. The apparatus defined in claim 22, wherein the temperature sensor is mounted such that it contacts the roller.

25. A method of calibrating sensors embedded within an object comprising the steps of:
(a) providing an object with sensors embedded therein;
(b) providing a calibration apparatus comprising:
- a foundation;
- a force generator mounted on the foundation configured to generate a force in a first direction;
- a load cell connected with the force generator that detects the magnitude of force applied by the force generator;
- a roller mounting member pivotally interconnected with the foundation and pivotable about a first axis of rotation, the first axis of rotation being generally perpendicular to the first direction;
- a roller rotatably mounted on the roller mounting member for rotation about a second axis of rotation, the second axis of rotation being generally perpendicular to the first direction, the roller protruding in the first direction sufficiently to apply a force to the object;

(c) actuating the force generator to apply a force to the object through the roller;

(d) measuring the force generated by the force generator with the load cell;

(e) measuring output from the sensor responsive to the force applied to the object by the roller; and (f) repeating the actuating, measuring and monitoring steps for different forces of differing magnitude to correlate pressure input with sensor output.

26. The method defined in claim 25, wherein step (b) comprises providing an apparatus that includes a pair of force generators and a pair of load cells.

27. The method defined in claim 25, further comprising the step of mounting the foundation plate of the apparatus on one of a lathe and a grinder.

28. A method of calibrating sensors embedded within an object comprising the steps of:

(a) providing an object with sensors embedded therein (b) providing a calibration apparatus comprising;
  a foundation;
  a force generator mounted on the foundation configured to generate a force in a first direction;
  a load cell connected with the force generator that detects the magnitude of force applied by the force generator;
  a roller mounting member pivotably interconnected with the foundation and pivotable about a first axis of rotation, the first axis of rotation being generally perpendicular to the first direction;
  a roller rotatably mounted on the roller mounting member for rotation about a second axis of rotation, the second axis of rotation being generally perpendicular to the first direction, the roller protruding in the first direction sufficiently to apply a force to the object;

(a) actuating the force generator to apply a force to the object through the roller;

(b) measuring the force generator by the force generator with the load cell;

(e) monitoring output from the sensor responsive to the force applied to the object by the roller; and (f) repeating the actuating, measuring and monitoring steps for different force of differing magnitude to correlate pressure input with sensor output; and (g) monitoring the temperature of the object and proceeding with steps (d) through (f) only after the object reaches temperature equilibrium.

29. The method defined in claim 25, further comprising the step of rotating the object about an axis of rotation substantially parallel to the second axis of rotating during steps (c) through (f).

30. The method defined in claim 29, wherein the object is a roll covered with a polymeric cover.

31. The method defined in claim 28, wherein the sensors are optical sensors.

32. The method defined in claim 25, further comprising the step of marking sensor locations on the object prior to step (c).

33. The method defined in claim 29, further comprising the step of adjusting the axis of rotation of the roller to be parallel to the axis of rotation of the object prior to step (c).

* * * * *

UNITED STATES PATENT AND TRADEMARK OFFICE
CERTIFICATE OF CORRECTION

PATENT NO.    : 6,892,563 B2
DATED         : May 17, 2005
INVENTOR(S)   : Gustafson et al.

It is certified that error appears in the above-identified patent and that said Letters Patent is hereby corrected as shown below:

Column 10,
Line 4, should read -- (c) actuating the force generator to apply a force to the --.
Line 6, should read -- (d) measuring the force generator by the force generator --.

Signed and Sealed this

First Day of November, 2005

JON W. DUDAS
*Director of the United States Patent and Trademark Office*